United States Patent

[11] 3,585,296

[72] Inventor Van Clifton Martin
Boulder, Colo.
[21] Appl. No. 871,932
[22] Filed Oct. 28, 1969
[45] Patented June 15, 1971
[73] Assignee International Business Machines Corporation
Armonk, N.Y.

[54] SYNCHRONIZED RECIPROCATING LENS PHOTOCOMPOSER
10 Claims, 9 Drawing Figs.

[52] U.S. Cl. ........ 178/15, 95/4.5
[51] Int. Cl. ........ H04n 1/04
[50] Field of Search ........ 178/15, 17 D; 346/33 A, 74 CR, 110 R; 235/61.115

[56] References Cited

UNITED STATES PATENTS 2,351,081 6/1944 Swift ........ 234/1.5
3,328,522 6/1967 Stone ........ 178/6.7

*Primary Examiner*—Kathleen H. Claffy
*Assistant Examiner*—Horst F. Brauner
*Attorney*—Littlepage, Quaintance, Wray & Aisenberg

ABSTRACT: A photocomposing apparatus forms patterns of images, such as alphameric characters, on a radiation sensitive record receiver or film by directing radiation from a cathode-ray tube screen to the radiation sensitive record receiver. The beam of the cathode-ray tube is controlled so that the beam moves in a single vertical trace, and the beam is blanked or unblanked under control of electrical signals, so that successive scans of radiation from said screen will form a pattern of an image when successive scans move across the film.

A lens or other refractive member in front of the screen directs the radiation to the record receiver and a motor drives the lens at uniform speed to move the successive scans across the record receiver, thus forming the pattern of one or more images across the film.

The sweep of the beam of the cathode-ray tube is altered in length to conform to the size of the images, i.e., characters, and may be of two different lengths, for smaller and larger characters. To avoid pincushion distortion, the trace of the sweep of the beam is centered by biasing the beam in accordance with the length of the sweep.

The speed of the motor is decreased with increase in the length of the sweep of the beam to maintain the same quality of reproduction. At the end of each line, the motor decelerates at a rate to stop the lens in the same position for any speed.

INVENTOR
VAN CLIFTON MARTIN
BY Littlepage, Quaintance, Wray, and Aisenberg.
ATTORNEYS

SYNCHRONIZED RECIPROCATING LENS PHOTOCOMPOSER

NATURE AND OBJECTS OF INVENTION

This invention relates to a photocomposing apparatus in which light radiation from a cathode-ray tube is directed to a radiation sensitive record receiver to form a pattern of images on the record receiver.

In this system, light radiation from the screen of a cathode-ray tube is directed in successive vertical scans across a radiation sensitive record receiver to form a pattern of an image on the record receiver. The beam of the cathode-ray tube is controlled to sweep along a single vertical trace. Electrical signals unblank the beam in segments of its sweep to form light radiation scans which sensitize the record receiver. A lens in the path of the radiation is moved by a driving motor at a uniform speed in both directions, and causes successive scans to traverse the record receiver, so that the record receiver is sensitized in a pattern which corresponds to the image.

It is an object of this invention to alter the length of the beam sweep to adapt it to images of different sizes. At the same time, the tube is biased to center the trace of the beam on the screen and avoid pincushion distortion of the images formed on the record receiver.

In the system illustrated, the sweep of the beam is controlled by a ramp generator, an oscillator actuated counter timing the ramp generator to produce sweeps of the beam for either 18-point or 36-point characters. Any characters smaller than 18-point may be formed by the shorter sweep, and those over this size are formed by the longer sweep, electrical signals setting circuits for control by oscillator actuated counters for either length of sweep.

The signal of the length of the sweep of the beam also sets the bias driver of the beam. This control centers the trace of the sweep on the screen and distortion of the image is minimized.

Since the sweep of the beam for 36-point characters is twice the length of the sweep for 18-point characters, the speed of movement of the scans across the record receiver must be reduced to one-half to maintain the same quality of reproduction. For this purpose, motor controls reduce the speed of the motor driving the lens when operating in 36-point as compared with the speed in 18-point.

The lens is stopped in the same position at the end of the line irrespective of the speed of the driving motor. This position is determined by the distance required to bring the motor up to speed at the beginning of the line for the faster travel in 18-point. Accordingly, the lens movement is decelerated more slowly in the slower speed operation to arrest the lens at the same point as in the faster speed of 18-point.

The foregoing and other objects, features and advantages of the invention will be apparent from the following more particular description of the preferred embodiments of the invention, as illustrated in the drawings.

DETAILED DESCRIPTION OF THE DRAWINGS

Figure 1:
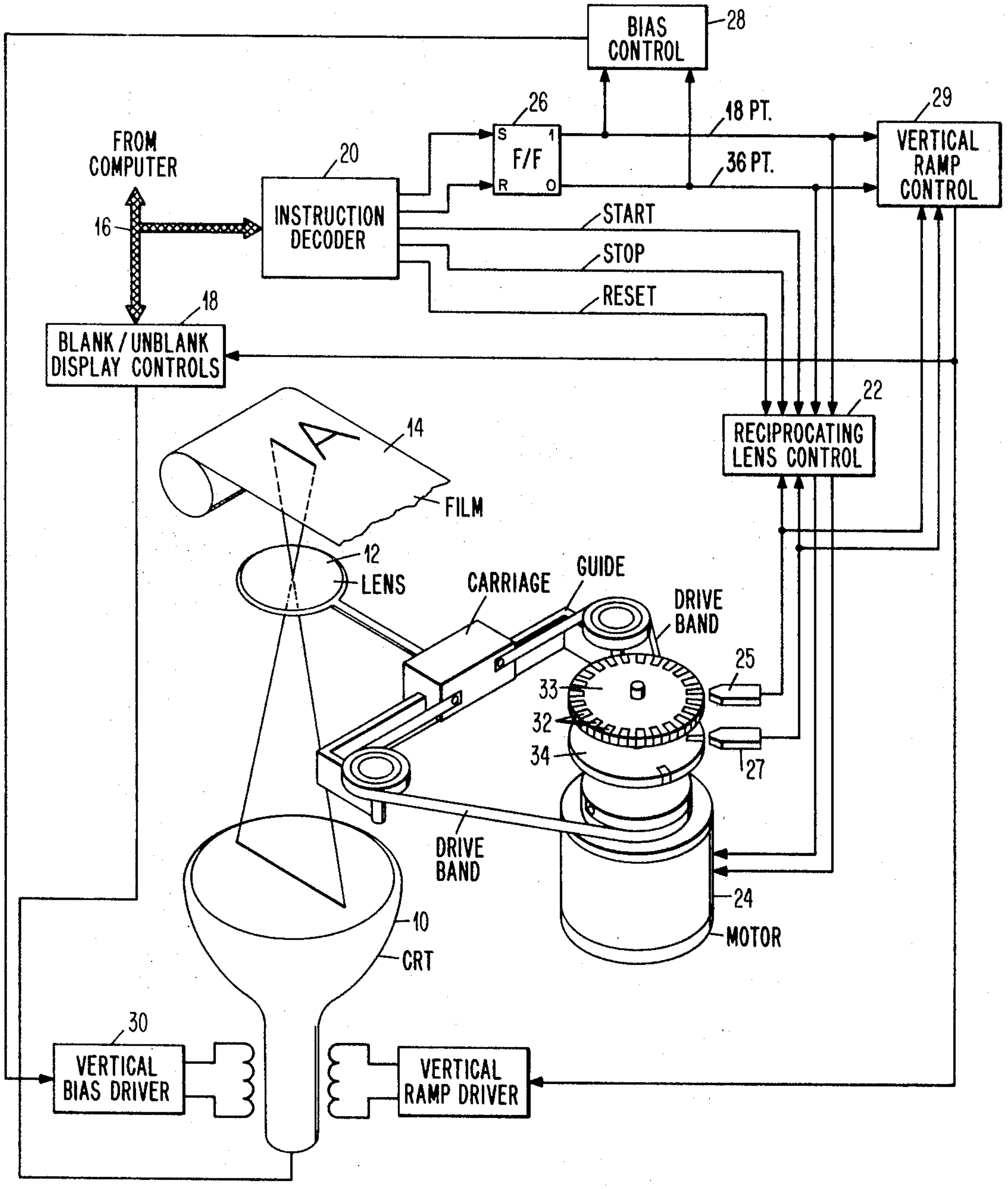
FIG. 1 illustrates generally the system of the photocomposer apparatus.

In FIG. 1, the overall photocomposing system sets the environment for the inventive apparatus for changing point size so as to accommodate an extremely wide range of printing type sizes. As explained previously, the invention is applicable to a photocomposing system utilizing a cathode-ray tube and a reciprocating lens to print the image of characters on photographic film. The film may then be used to make printing plates by a photo etch process.

In FIG. 1, the cathode-ray tube 10 cooperates with lens 12 to project a series of vertical scans onto film 14. Each vertical scan is divided into blank and unblank scan items. The unblank scan item in a single scan is the portion of the scan representing a piece of the character to be printed on film 14. The scans on the cathode-ray tube 10 all take place at the same position on the surface of the tube. Horizontal positioning of adjacent scans on film 14 is accomplished by horizontal movement of lens 12.

The control signals indicating the formatted text to be printed by the apparatus in FIG. 1 comes over channel 16 from a computer, which is not shown. The information from the computer contains blank/unblank data which is used to control the cathode-ray tube as it displays each vertical scan on the surface of tube 10. The blank/unblank or scan item signals from the computer are passed to the blank/unblank display controls 18 via channel 16. The controls then directly operate on the intensity control of the cathode-ray tube to control the blanking or unblanking of the cathode-ray beam.

Other signals arriving over channel 16 from the computer are instructions relating to control of (1) the vertical ramp drive for the cathode-ray tube, (2) the vertical biasing drive for the cathode-ray tube, and (3) motor drive which positions the reciprocating lens 12. These instructions from the computer are passed to instruction decoder 20 by channel 16. Instruction decoder 20 is merely a register with logic attached thereto to detect the presence of binary codes and to issue a signal indicating the code received.

Figure 3:
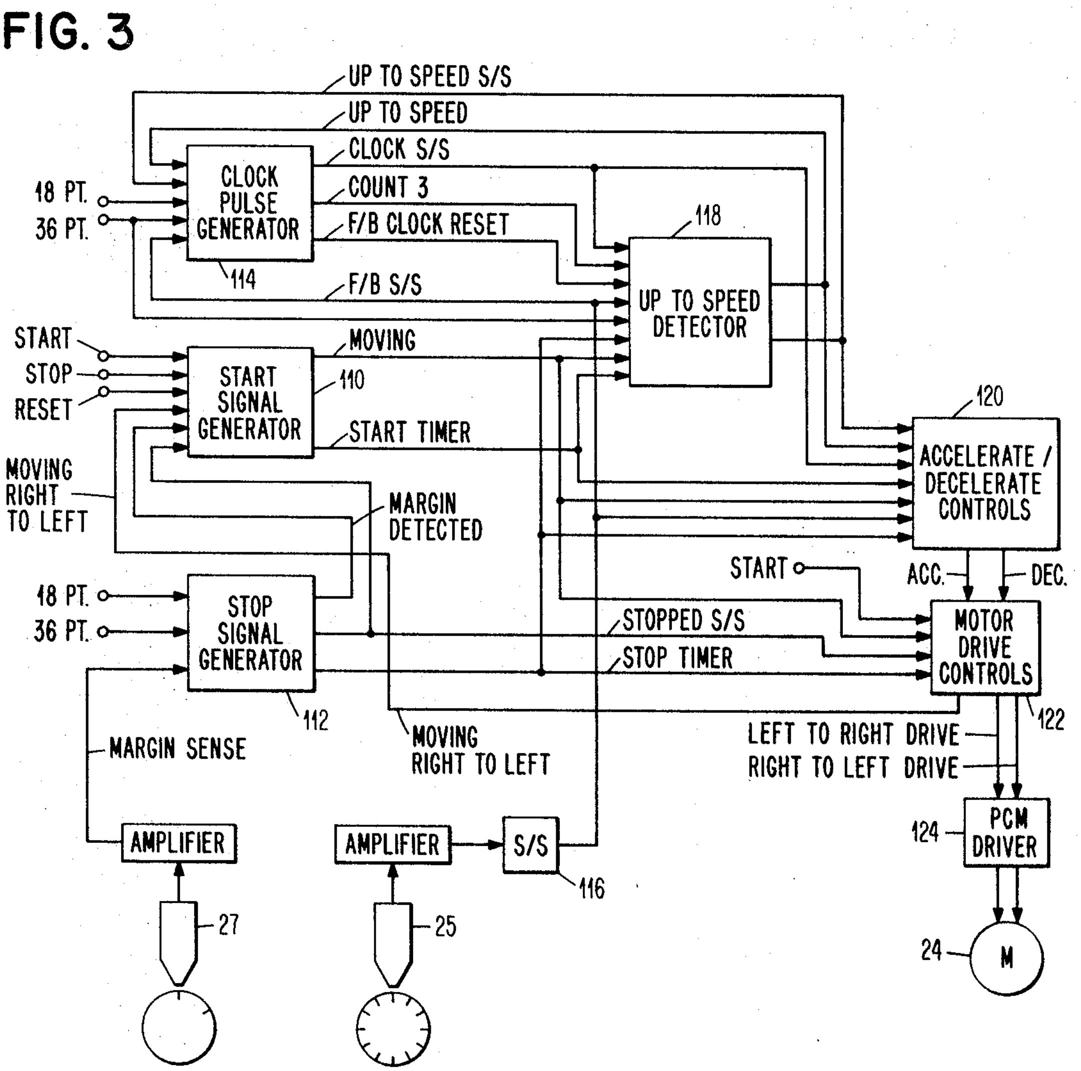
FIG. 3 illustrates generally the control for moving the lens.

The decoded start, stop, and reset signals from the decoder are passed to a reciprocating lens control 22. The output of the reciprocating lens control drives the motor 24, which positions lens 12. The speed of the lens 12 is monitored by magnetic transducer 25. Transducer 25 puts out a pulse each time a magnetic spot 32 on disc 33 moves past it. Discs 33 and 34 are attached to the shaft of motor 24. The crossing of a margin of the print area by the lens is monitored by magnetic transducer 27. Transducer 27 puts out a pulse when either of the two magnetic spots on disc 34 move past it. One spot corresponds to the left margin, while the other corresponds to the right margin. Signals from transducers 25 and 27 are passed to reciprocating lens control 22 and the vertical ramp control 29. The preferred embodiment of reciprocating lens control 22 is shown in FIG. 3, which will be described later.

Additional decoded instructions from decoder 20 are used to switch flip-flop 26, and are indicative of whether the print size varies up to 18-point or up to 36-point. If the present range is up to 18-point, then instruction decoder 20 generates a signal which sets flip-flop 26. The "1" side of flip-flop 26 is up and signals the bias control 28 and the vertical ramp control 29 that print size up to 18-point is being used. The 18 point signal also is passed to reciprocating lens control 22 to adjust the speed of movement of the lens 12, as will be explained shortly.

The effect of the 18-point signal in the vertical ramp control is to control or change the amount of vertical sweep through which the cathode-ray beam is driven during each scan. The 18-point signal is also passed to the bias control, whose function is to control the amount of reference bias used on the vertical deflection of the beam in cathode-ray tube 10. Cathode-ray tube 10 is a double-yoke-drive cathode-ray tube, wherein each dimension of movement of the cathode-ray beam is controlled by two yokes. A vertical bias yoke sets a reference point for vertical scan, while a vertical ramp yoke deflects the cathode-ray beam from this vertical reference point.

In the event there is a change in the range of print size, it is necessary to change the vertical bias reference point. Accordingly, the bias control 28 is a transistor switch which connects one DC level to vertical bias driver 30 when the print range is 18-point and connects another voltage level to vertical bias driver 30 when the range is 36-point.

Figure 4:
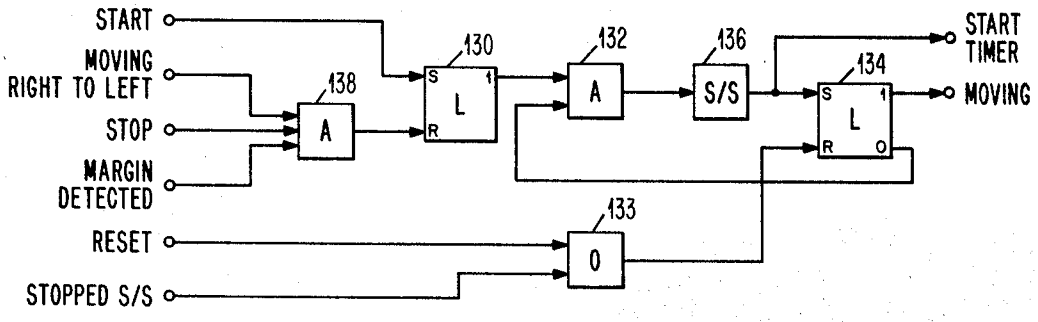
FIG. 4 is a schematic diagram of the Start Signal Generator of FIG. 3.

Returning to blank/unblank display controls 18 and vertical ramp control 29, apparatus to implement these two devices is shown in copending, commonly assigned U.S. Pat. application, Ser. No. 682,843, filed Nov. 14, 1967, entitled, "Photocomposer," and invented by Ernest P. Kollar. FIG. 4 of the copending Kollar patent application has been reproduced, as FIG. 2, herein. A small amount of additional logic has been added to the Kollar hardware as required by the present invention. The vertical ramp control portion 29 corresponds to vertical ramp control 29 in FIG. 1, while the blank/unblank display controls portion 18 corresponds to controls 18 in FIG. 1.

Figure 2:
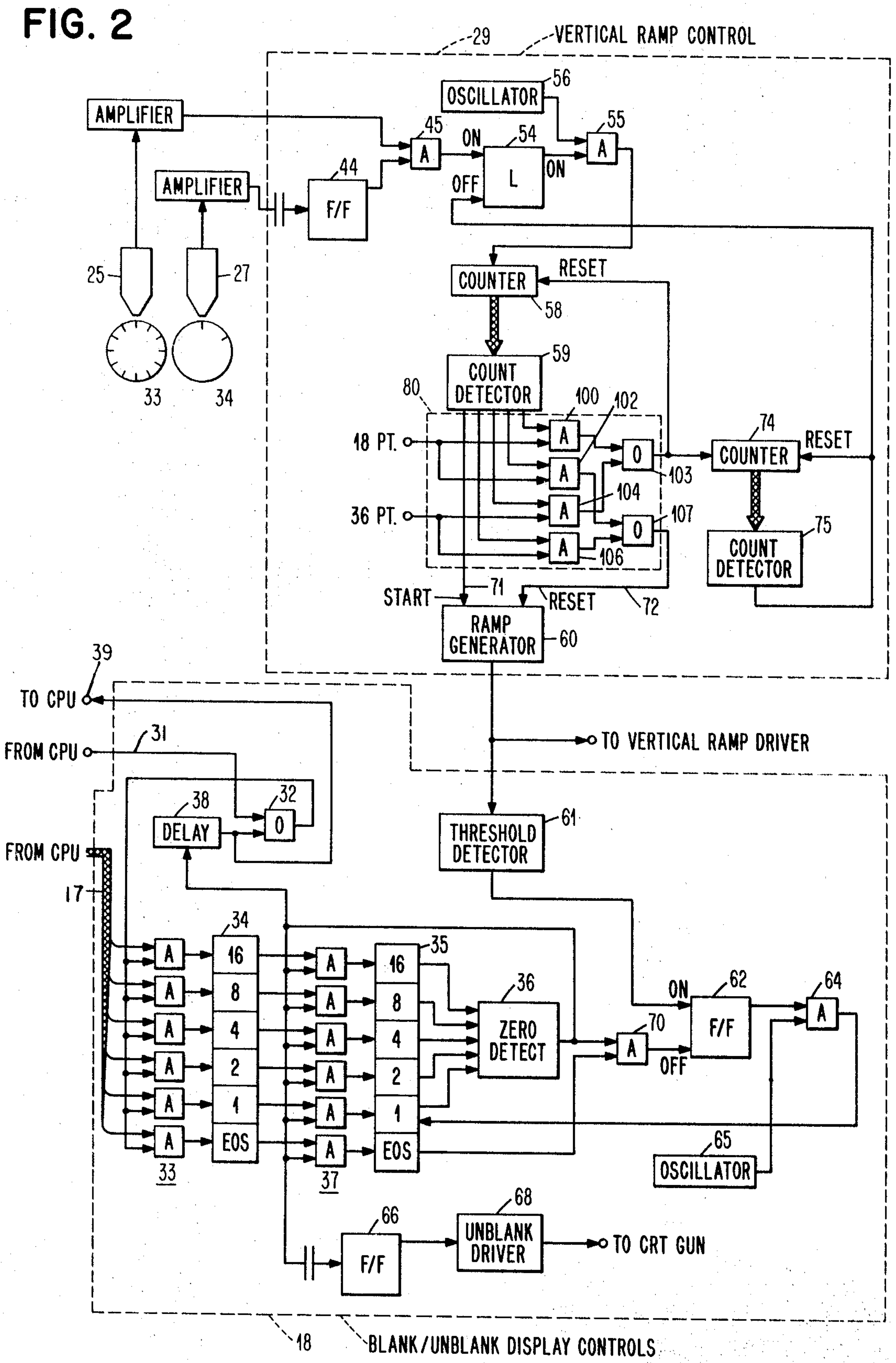
FIG. 2 is a schematic diagram of the cathode-ray tube controls.

Schematic blocks in vertical ramp control 29 and blank/unblank controls 18 of FIG. 2 have been given the same reference numerals as in FIG. 4 of the copending Kollar patent application. The additional hardware added to the vertical ramp control to adapt the Kollar teaching, for use in the present invention, consists of the AND/OR logic 80 shown inside vertical ramp control 29 of FIG. 2.

When the motor start command has been given, the first scan-item count is present on data bus 17 from the computer. The computer energizes line 31 which causes OR 32 to activate the AND gates shown generally at 33, so that the first scan-item count is transferred into register 34. Decrementing counter 35 initially contains all zeros. Zero detector 36 will, therefore, have an output which conditions the AND gates shown generally at 37. Thus, the first scan-item count will be immediately transferred from register 34 into decrementing counter 35. Since counter 35 no longer contains all zeros, the output of detector 36 will drop, deconditioning AND gates 37. After passing through delay 38, the drop of the detector 36 signal can be sensed by the computer at terminal 39. In response to the signal on terminal 39, the computer loads the next scan-item count on data bus 17 and energizes line 31. This conditions AND gates 33 and causes the second scan-item count to be written into register 34.

Disc 34, while the motor is starting, would be positioned so that detector 27 would be in the narrow gap between magnetic spots. After the motor has been brought to operating speed and the first magnetic spot has been sensed by magnetic transducer 27, a short pulse will be introduced to flip-flop 44. Flip-flop 44 is AC triggered so that it will change state each time a pulse arrives at its input. When the flip-flop 44 is set, its output conditions AND gate 45.

Transducer 25 monitors disc 33 and produces output pulses indicative of horizontal distance traveled by the reciprocating lens. Each pulse, for example, corresponds to a horizontal spacing of 16 vertical scans, As soon as the first magnetic spot on disc 33 is sensed by transducer 25, after flip-flop 44 is set, latch 54 is set. The set condition of latch 54 enables AND gate 55. AND gate 55 then passes the output of oscillator 56 to counter 58. The purpose of oscillator 56 is to provide a timing signal to control the turning on and turning off of ramp generator 60.

The first pulse from oscillator 56 through AND gate 55 is counted by counter 58. Count detector 59 consists of logic circuits for providing an output when, and only when, specific counts are contained in counter 58. When the first count is present in counter 58, count detector 59 will send a start signal over line 71 to ramp generator 60. Generator 60 begins to produce a ramp signal for the vertical deflection of the beam in the cathode-ray tube. Threshold detector 61 is provided to detect when the deflection of the cathode-ray beam is up to speed. In other words, an output from detector 61 indicates that the linear portion of the ramp from ramp generator 60 has been reached. This output from detector 61 is utilized to set flip-flop 62 in the blank/unblank display controls.

With flip-flop 62 set, AND 64 is enabled and passes the pulses from oscillator 65. Each pulse from oscillator 65 can be considered to be representative of one black/white block in the vertical scan. These pulses are passed to decrementing counter 35 where they count down the scan-item count to zero.

The first scan-item count of each scan is representative of a blanked portion, and, accordingly, flip-flop 66 will remain reset throughout the decrementing of the first scan-item count. As a result, no output is produced by unblank driver 68, and the beam produced by the cathode-ray tube gun will remain blanked. When the first scan-item count is decremented to all zeros in counter 35, zero detector 36 will produce a pulse which will, (1) cause flip-flop 66 to change state and begin unblanking the cathode-ray tube beam, (2) enable AND gates 37 to transfer the second scan-count item from register 34 to counter 35, (3) after passing through delay 38, enable AND gates 33 to transfer the third scan-item count from data bus 30 into register 34, and (4) signal to the computer, via line 39, that the fourth scan-item count may be placed on data bus 30.

Cathode-ray beam unblanking will continue until the second count item is decremented to zero in counter 35. At that point, detector 36 will cause flip-flop 66 to again change state so that the beam will be blanked for the next scan-item count.

Eventually, the last scan-item count of a vertical scan will be loaded into counter 35 and decremented to zero. In this scan-item count, the end-of-scan flag bit contains a "1" rather than a "0". Therefore, the presence of this EOS bit and the output of detector 36 will produce an output through AND gate 70 turning flip-flop 62 off. AND gate 64 is then inhibited, and no further decrementing pulses from oscillator 65 reach counter 35.

The last scan-item count of a vertical scan always represents an unblanked segment. Therefore, the last zero-detect pulse from detector 36 will clear flip-flop 66 so that it is, again, in the blank condition during (1) the remainder of the vertical scan, and (2) fly back of the cathode-ray beam.

Whether or not the last scan-item count is coextensive with the end of the ramp, counter 58, in vertical ramp control 29, continues to count pulses from oscillator 56. When the counter contains a count equivalent to the length of the desired ramp, detector 59 produces a signal which can be utilized to effect the resetting of ramp generator 60. The resetting of the ramp generator involves the additional hardware necessary to adapt the Kollar teachings to use in the present invention.

If the operation is 18-point mode, then AND gates 100 and 102 are enabled. AND gate 102 passes a signal from count detector 59, via OR gate 107, to reset ramp generator 60. The signal passed by AND gate 102 represents the detection of a count of a magnitude such that generator 60 will have had sufficient time to generate a ramp of amplitude desired for 18-point printing.

AND gate 100 passes a count-detected signal from detector 59, via OR gate 103, to reset counter 58. The count-detected signal passed by AND gate 100 represents a slightly larger count than that passed by AND gate 102. This difference in count is necessary to allow ramp generator 60 time to reset prior to the resetting of counter 58 back to zero. In this way, ramp generator 60 is immediately ready to begin again when counter 58 is reset.

In 36-point mode, the operation is exactly the same, except that AND gates 104 and 106 are enabled. AND gate 106 passes the count-detected signal used to reset ramp generator 60, while AND gate 104 passes the count-detected signal used to reset counter 58. Of course, in 36-point mode, the counts detected as reset conditions are much larger (for example, a factor of two) than for 18-point mode.

The reset signals out of OR gate 103 are also passed to counter 74. As mentioned hereinbefore, transducer 25 will produce one pulse for a horizontal spacing intended for 16 vertical scans. Counter detector 75 determines when counter 74 has received 16 pulses. Count detector 75 then resets both counter 74 and latch 54. It has been found that the circuitry may tend to drift so that 16 vertical scans will actually be completed before the horizontal spacing for these scans has passed. To compensate, the clearing of latch 54 by the output of detector 75 prevents the initiation of any further vertical scans until the next pulse is received from transducer 25, so as to set latch 54.

The detection of the second magnetic spot on disc 34 by transducer 27 represents the end margin for the line of characters. This second pulse from transducer 27 will change the state of flip-flop 44 and inhibit AND gate 45. This prevents initiation of any further vertical scans, and, thus, deactivates printing when the end margin is crossed.

Reviewing the operation of FIG. 1, reset and start instructions from the computer are decoded by decoder 20 and passed to lens control 22. The lens position is initially at the left side of the document. The start signal begins the energization of the motor 24 and accelerates the lens to the horizontal print speed desired. The function of the lens control is to control the speed of movement of the lens during 18-point and 36-point operation and, also, to control the acceleration of the lens up to the proper speed. The reciprocating lens control must also have an 18-point or 36-point signal input. If there is a change in print size mode, there will be a mode instruction decoded by decoder 20 prior to the start signal.

The information following a start command from the computer is the character display data which is processed by display controls 18. The output from the display controls operates on cathode-ray tube 10 to control the intensity of the beam during each scan so that a character may be printed on film 14.

The generation of scans on the cathode-ray tube screen is controlled by vertical ramp control 29 and the reference position of the scan is controlled by bias control 28. Each of these control blocks receives a signal indicating whether 18-point or 36-point mode operation is desired. In 18-point mode operation, bias control 28 supplies a bias signal to bias driver 30 to provide a reference point for the vertical scan. The reference point is chosen to keep the scan centered on the cathode-ray tube screen, to minimize pincushion distortion and also to avoid focus deterioration. The 18-point mode signal is also passed to the vertical ramp control to control the amplitude of the vertical ramp signal.

In 36-point mode operation, the instruction decoded by decoder 20 resets flip-flop 26 to signal the controls 29 and 28 to switch to 36-point mode operation. Bias control 28 changes the bias voltage applied to the vertical bias driver 30 to move the reference scan position lower on the cathode-ray tube screen. The 36-point mode signal applied to vertical ramp control 29 acts to increase the amplitude of the vertical ramp signal which deflects the cathode-ray beam. Adjustment of the bias and ramp are both necessary to keep the cathode-ray beam deflection pattern centered on cathode-ray tube 10. If the deflection ramp signal were enlarged without a correction on the bias signal, the deflection signal could drive the beam off screen, or into an area where pincushion correction would be required.

This concludes the description of adjustment of the cathode-ray beam scanning when it is desired to change from 18-point mode to 36-point mode in operation. The adjustment of the reciprocating lens movement for a large change in print size requires a number of complex operations in the reciprocating lens control 22.

In FIG. 3, a block diagram of reciprocating lens control 22 (FIG. 1) is shown. To relate FIG. 3 to FIG. 1, the input lines have been labeled and the transducers 25 and 27 have been shown along with a schematic representation of motor 24. The functional blocks shown in FIG. 3 will be described in detail hereinafter. For the purposes of FIG. 3, the functions of the different blocks are as follows.

The start signal generator 110 generates the start timer signal and the MOVING signal used to initiate operation of motor 24. Initiation is caused either by a start command from the computer or an internal regenerated signal from within the start signal generator. The internal regenerated signal is in response to a STOPPED SINGLE-SHOT pulse applied to the start signal generator. This pulse indicates that the reciprocating lens is at the margin of one line and is ready to be moved back in the opposite direction. As discussed previously, the reciprocating lens moves at a constant speed over the print area of the page and is used in a printing operation during both directions of motion. In other words, there is no flyback of the reciprocating lens. Both directions of the movement of the lens are utilized in the printing operation.

Other signals into the start signal generator 110 are the MOVING RIGHT-TO-LEFT signal, the STOP signal, and the MARGIN DETECTED signal. These signals are used to inhibit the start signal generator when a stop command is received from the CPU (Central Processing Unit). The MOVING RIGHT-TO-LEFT and the MARGIN DETECTED signals ensure that the reciprocating lens is always stopped at the left margin, as a result of a CPU stop command. The exact functioning of the start signal generator will be described later with reference to FIG. 4.

The stop signal generator 112 responds to the MARGIN SENSE signal from the transducer 27. Transducer 27 detects right and left margins by detection of a mark on a rotary disc 34 attached to the shaft of motor 24 (see FIG. 1). The MARGIN SENSE signal is used by the stop signal generator 112 to control the amount of stop delay before a stop signal is turned on to decelerate the reciprocating lens after it has passed the print margin. The stop signal generator is made up of a stop delay circuit in a stop timer circuit.

The stop delay circuit responds to a 36-point mode of operation signal to lengthen the amount of delay before the stop timer circuit is actuated. This lengthening of the time period before operation of the stop timer is necessary during 36-point mode operation because the reciprocating lens is moving at a slower speed. If the lens is to be stopped at the same position for both modes of operation, it is therefore necessary to lengthen the amount of delay before the stop timer is actuated when moving at the slower 36-point mode speed. As explained previously, it is necessary to stop at the same position because a given amount of time or space is necessary to accelerate the lens back up to speed when the printing of the next line commences. The amount of space is controlled by the amount of time required to accelerate the lens to the 18-point mode speed prior to the lens crossing the margin and entering the print region of the film.

The stop timer in the stop signal generator is responsive to the 18-point mode of operation signal to lengthen the amount of time the STOP TIMER signal is on during 18-point mode deceleration. The amount of time the stop timer is on is lengthened because the 18-point mode speed of the reciprocating lens is much higher than the 36-point mode speed. Therefore, to stop the lens with the same rate of deceleration as for 36-point mode, a longer period of time for decelerating is required.

In summary, the stop signal generator controls deceleration of the reciprocating lens after the lens has crossed a margin and is thus out of the print area. The deceleration is controlled as to the length of time and also as to when it is operative so that the position of the lens when it is at rest at either side will always be the same and will permit adequate space for acceleration back up to speed for either 18-point or 36-point operation.

The clock pulse generator 114 generates a clock pulse or CLOCK SINGLE-SHOT signal which is used for comparison with a FEEDBACK SINGLE-SHOT signal from single-shot 116. The comparison takes place both in the up-to-speed detector 118 and the accelerate/decelerate controls 120. The comparison in the up-to-speed detector 118 is utilized to determine when the period of acceleration is finished (i.e., the lens is up to print speed). The comparison in the accelerate/decelerate controls is a serving operation utilized to keep the speed of the lens constant during the printing operation.

Clock pulse generator 114 is operative to put out clock pulses at two selective rates. When operating in 36-point mode, the clock pulses are at a lower frequency than when operating in the 18-point mode. Synchronization of these clock single-shot pulses with the feedback single-shot pulses will be explained in more detail later with reference to FIG. 6.

The accelerate/decelerate controls 120 perform a comparison operation between the time sequencing of feedback single-shot pulses and clock single-shot pulses. This comparison is used to provide accelerate or decelerate signals for the motor drive controls to keep the speed of the motor and thereby speed of the lens substantially constant. In addition, the accelerate/decelerate controls contain a hunt cycle minimization circuit. This circuit monitors the accelerate/decelerate signals once after each change from an accelerate to decelerate mode; or decelerate to accelerate mode, if it then detects that a succession of accelerate or decelerate signals are being used, it interjects a large accelerate or decelerate signal as is appropriate. In other words, if two or more accelerate signals occur in sequence following two or more decelerate signals indicating that the motor is going too slow, then the hunt cycle control circuits will interject a large accelerate pulse to bring the motor rapidly back to speed. Conversely, if two successive decelerate signals are detected following two or more accelerated signals, then the hunt cycle control circuits interject a large decelerate signal to slow the motor rapidly back to the proper speed. It happens that the maximum acceleration or deceleration sequences usually occur as the motor is approaching the coincidence of clock and feedback pulses. By inserting the hunt cycle control, the speed curve of the motor is selectively damped so that the motor more rapidly settles in on the desired speed. The accelerate/decelerate controls will be described in detail hereinafter with reference to FIG. 8.

The motor drive controls 122 in FIG. 3 control the direction of motion of the motor and provide the drive signals to accelerate or decelerate the motor. The motor drive controls consist of logic to determine whether a left-to-right drive signal or a right-to-left drive signal should be applied to the printed circuit motor (PCM) driver 124. Which signal is passed to the driver depends upon four possible conditions—left-to-right and accelerating, left-to-right and decelerating, right-to-left and accelerating, and right-to-left and decelerating. For example, if the motor is moving left-to-right and deceleration is desired, then the right-to-left drive line would be temporarily excited.

The PCM driver 124 is shown in detail in U.S. Pat. No. 3,443,186, entitled, "Reversing Motor Drive for Type Bar," and invented by the same inventor as the present invention. Hardware similar to the accelerate/decelerate controls and the motor drive controls herein is shown in this U.S. Pat. No. 3,443,186.

Now referring to FIG. 4, the detailed operation of the start signal generator is as follows. Initially, latch 130 is reset as a result of a previous turnoff operation. When a start command is received from the CPU, the latch 130 is set and this enables AND gate 132. AND gate 132 will then pass the output from the zero side of latch 134. The zero side of latch 134 will be up since a reset command from the computer resets latch 134 prior to the start command. The output from AND gate 132 fires single-shot 136 which produces the start timer signal. The start timer signal starts the motor to accelerate the lens up to speed. The start timer pulse from single-shot 136 also sets latch 134 whose output indicates that the lens is now moving.

After the lens has moved all the way across the line, a Stopped Single-Shot signal will be received from the stop signal generator 112 (FIG. 3). The Stopped Single-Shot signal is passed by OR gate 133 to reset the Moving latch 134. Since the CPU has not sent a stop command to start signal generator, the latch 130 will still be set and, thus, AND gate 132 will still be enabled. Therefore, when latch 134 is reset, the up signal on the zero output of latch 134 will be passed by AND gate 132 to again fire single-shot 136. The start timer signal from single-shot 136 again initiates movement of the lens by turning on the motor and beginning acceleration of the lens to move it back across the document or film to be printed. Again, the latch 134 is set by the single-shot 136 to indicate that the lens is again moving.

When the printing operation on the film is complete, a stop command will be sent from the CPU and be received at AND gate 138. AND gate 138 will not generate an output, however, until it receives signals indicating that the lens is moving from right to left and that the lens has crossed a margin. AND gate 138 will then reset the latch 130, which will inhibit AND gate 132. Accordingly, when the lens reaches the end of this final line, the Stopped Single-Shot signal will reset latch 134, but single-shot 136 will not be fired because AND gate 132 is inhibited. Thus, the lens will come to rest at the left edge of the film and be ready to start operation again upon receipt of the next start command from the CPU.

Figure 5:
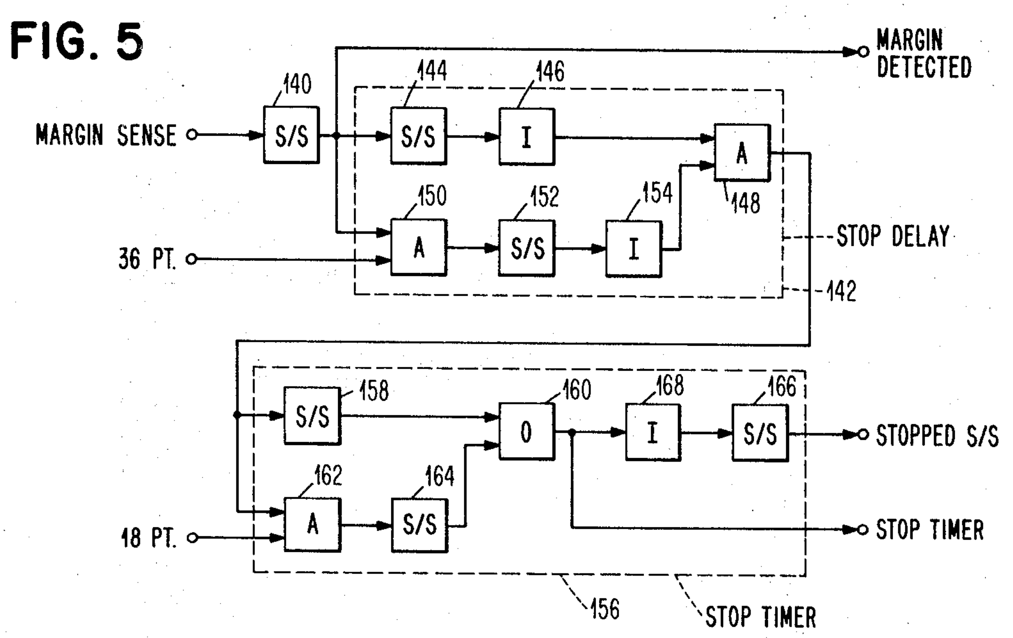
FIG. 5 is a schematic diagram of the Stop Signal Generator of FIG. 3.

The details of the stop signal generator, which controls the deceleration of the lens at the end of a line, are shown in FIG. 5. The stop signal generator is triggered into operation by receiving an amplified margin sense pulse from transducer 27. The transducer 27 monitors disc 34 attached to the motor 24 to sense when there has been enough rotation of the motor that the lens is crossing a margin. The leading edge of the amplified margin sense pulse fires single-shot 140. The purpose of the single-shot is to produce a well-shaped short pulse from the detection of the leading edge of the margin sense pulse. The margin detected pulse from single-shot 140 enters a stop delay circuit 142 identified by the dotted lines in FIG. 5.

The stop delay circuit 142 controls how much delay occurs between the detection of a margin and the firing of the stop timer. The margin detected pulse from single-shot 140 fires single-shot 144. The output from single-shot 144 is a pulse of relatively short duration. This shorter pulse is inverted by inverter 146 and applied to AND gate 148. Simultaneously, the margin detected pulse, which fired single-shot 144, is applied to AND gate 150. If AND gate 150 is enabled by a 36-point mode operation signal, the margin detect pulse is passed by the AND gate to the single-shot 152. Single-shot 152 is fired by the leading edge of the pulse and has an output pulse whose duration is much longer than the duration of the pulse from single-shot 144. The output from single-shot 152 is inverted by inverter 154 and applied to AND gate 148.

If 18-point mode operation is in effect, then only single-shot 144 is fired. AND gate 148 is enabled by the output from inverter 154 and is effectively looking for the trailing edge of the pulse from single-shot 144. When the trailing edge occurs, it is inverted by inverter 146, and AND gate 148 has an output. The leading edge of the signal from AND gate 148 fires the stop timer circuit 156, indicated by dashed lines in FIG. 5.

In 36-point mode operation, the stop delay circuit 142 does not produce a leading edge out of AND gate 148 until a much later time after the margin detected pulse occurs. In this situation, AND gate 150 is enabled and, thus, when single-shot 144 fires, single-shot 152 also fires. The output from single-shot 152 is inverted and, thus, inhibits AND gate 148 until the trailing edge of the pulse from single-shot 152. Prior to the pulse from single-shot 152 expiring, the pulse from single-shot 144 will have expired. Thus, the AND gate 148 is now enabled by the inverter 146 to look for the trailing edge of the pulse from single-shot 152. When this trailing edge occurs, inverter 154 causes AND gate 148 to have an output. The leading edge of the output from AND gate 148 fires the stop timer.

In summary, the stop delay circuit 142 will generate a signal whose leading edge is utilized to fire the stop timer. The time at which this leading edge occurs in controlled by whether 18-point mode operation or 36-point mode operation has been signaled by the CPU. As previously discussed, the purpose of the change in delay is to change the time at which deceleration of the lens begins when there is a change in speed of the lens as signaled by a change in 18-point to 36-point mode operation.

The delayed signal from the stop delay 142 fires the single-shot 158 in stop timer 156. The pulse from single-shot 158 is the stop timer pulse and is passed by OR gate 160 to the output line labeled "stop timer." The stop timer signal is used by the up-to-speed detector and by the motor drive controls. Its primary function is to control the deceleration period of the lens.

If the printing system is operating in 18-point mode, the lens is moving at a much faster rate than in the 36-point mode. Therefore, it is necessary to have a longer stop timer period to decelerate the lens. This is accomplished by using the 18-point mode signal to enable AND gate 162. With AND gate 162 enabled, the signal from stop delay 142 will fire single-shot 164. The pulse from single-shot 164 is much longer in duration than the pulse from single-shot 158 and effectively swamps out the latter signal. The long stop timer pulse from single-shot 164 is passed by OR gate 160 and becomes the stop timer signal.

The output from OR gate 160 also fires a stopped single-shot 166. Single-shot 166 is fired by the trailing edge of the pulse out of OR gate 160 since the output of OR gate 160 is inverted by inverter 168 before it is applied to the single-shot 166. Accordingly, the stopped single-shot 166 is fired at the end of the stop timer pulse. The stopped single-shot pulse tells the motor drive controls and the start signal generator that the lens has stopped.

As previously discussed, the stopped single-shot pulse causes the start signal generator 110 to regeneratively produce another start timer pulse. At the motor drive controls, the stopped single-shot pulse is used to detect when the lens is reversing its direction of motion. The latter operation will be discussed in detail later with reference to FIG. 9.

Figure 6:
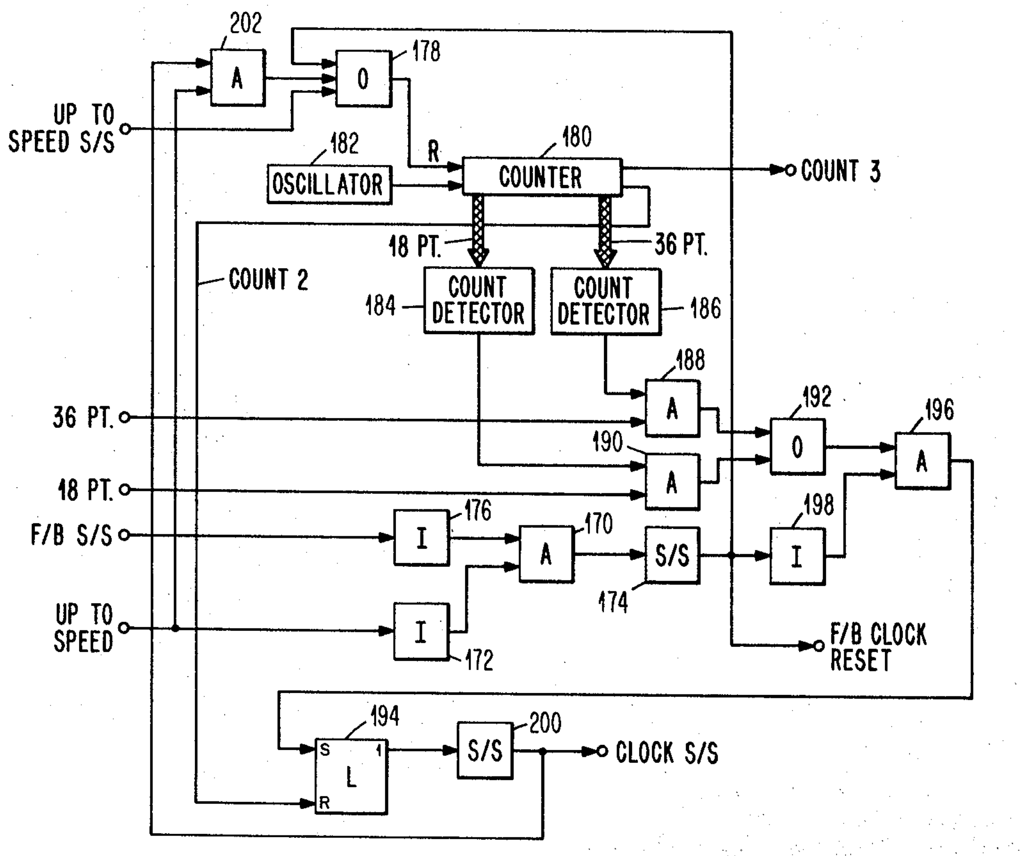
FIG. 6 is a schematic diagram of the Clock Pulse Generator of FIG. 3.

Referring now to FIG. 6, the details of the clock pulse generator are shown. As pointed out previously, the clock pulse generator generates a clock single-shot signal which is compared in time sequence with the signal from the feedback single-shot to detect when the lens is up-to-speed and, thereafter, it is used in a serving operation to keep the lens at speed.

Initially, when the lens is accelerating up to speed, AND gate 170 will be enabled by inverter 172. Inverter 172 has an output because the lens is not yet up to speed, as detected by the up-to-speed detector 118 (FIG. 3). With AND gate 170 enabled, the trailing edge of the pulse from feedback single-shot 116 (FIG. 3) will produce a rising transition out of AND gate 170 which fires single-shot 174. Single-shot 174 is fired on the trailing edge of the feedback single-shot pulse because the inverter 176 inverts the single-shot pulse before it is applied to the AND gate 170. The output from single-shot 174 is the Feedback Clock Reset signal. This reset signal is passed by OR gate 178 and resets the counter 180.

Counter 180 is continuously advanced in count by pulses from oscillator 182. Count detectors 184 and 186 monitor the count in the counter 180 to generate timing pulses each time a given count is reached. The count being monitored by count detector 184 is the count which produces a timing pulse for the 18-point mode of operation. Similarly, count detector 186 monitors a higher count to generate a timing or clock pulse for the 36-point mode operation.

AND gates 188 and 190 are operative to select the clock pulse associated with 18-point or 36-point mode. In 36-point mode operation, AND gate 188 is enabled to pass the clock pulse out of count detector 186. In 18-point mode operation, AND gate 190 is enabled to pass the clock pulse out of count detector 184. OR gate 192 operates to collect the pulse from either AND gate 188 or 190 and pass it on to latch 194 via AND gate 196. AND gate 196 is only inhibited by the output from inverter 198 during the feedback clock reset pulse. Otherwise, AND gate 196 is enabled and will pass the clock pulses to set latch 194. The purpose of AND gate 196 is to prevent any clock pulses from setting the latch 194 at the same time that the counter 180 is being reset. The output from latch 194 fires single-shot 200 which produces the Clock Single-Shot signal used by the up-to-speed detector 118 (FIG. 3) and the accelerate/decelerate controls 120 (FIG. 3).

The Clock Single-Shot pulse is also fed back to AND gate 202. If the lens is up to speed, AND gate 202 is enabled and thus the Clock Single-Shot pulse is passed by AND gate 202 and OR gate 178 to reset counter 180. Counter 180 may also be reset by the Up-to-Speed Single-Shot pulse so that, immediately upon the lens reaching an up-to-speed condition, the counter 180 is reset to begin the generation of Clock Single-Shot pulses which will keep the lens at a proper speed.

Figure 7:
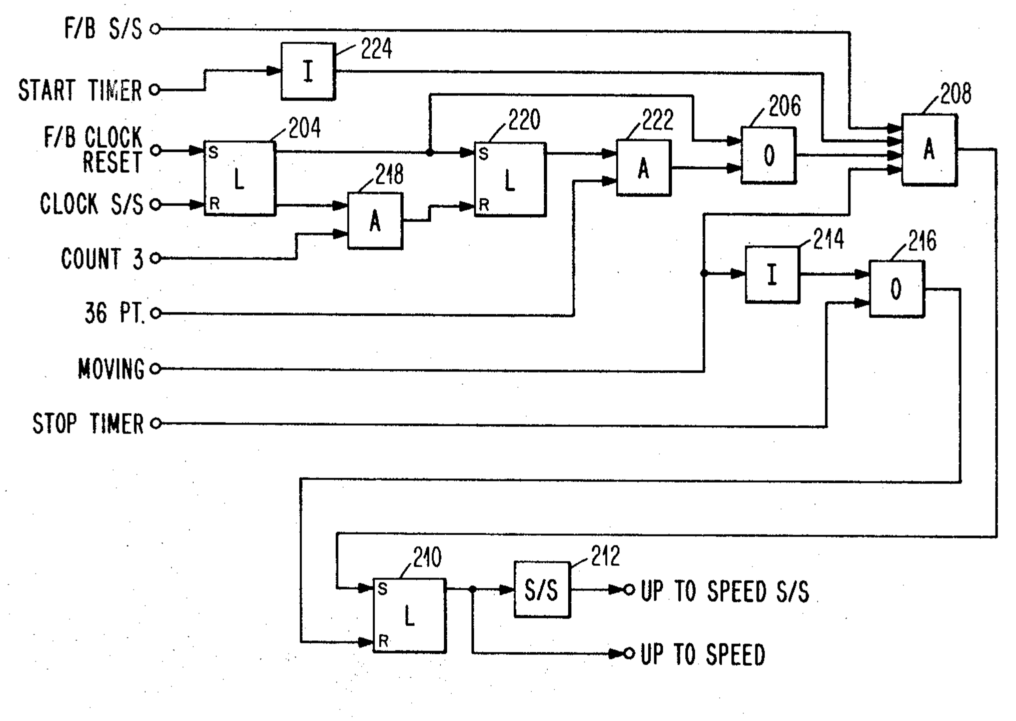
FIG. 7 is a schematic diagram of the Up-to-Speed Detector of FIG. 3.

To understand the operation of the clock pulse generator, it is also necessary to be familiar with the up-to-speed detector shown in FIG. 7. The up-to-speed detector monitors the Feedback Clock Reset signal and the Clock Single-Shot signal from the clock pulse generator to detect when the lens is up to speed. Upon reaching that condition, an up-to-speed signal is generated.

Initially, latch 204 in FIG. 7 is reset by the Clock Single-Shot pulses occurring during the previous movement of the lens before it was stopped. Latch 204 is not set until the first Feedback Clock Reset pulse occurs during acceleration as the lens again begins to move. This set condition of latch 204 is passed by OR gate 206 to AND gate 208.

AND gate 208 is effectively comparing the time of occurrence of Feedback Single-Shot pulses with the time of occurrence of Clock Single-Shot pulses. If a Feedback Single-Shot pulse occurs prior to the next Clock Single-Shot pulse, AND gate 208 will generally have an output if the start timer has elapsed and, also, if a Moving signal has been received. These conditions are necessary to enable the AND gate 208. If the Clock Single-Shot pulse occurs prior to the Feedback Single-Shot pulse, latch 204 is reset prior to the Feedback Single-Shot pulse reaching AND gate 208. Therefore, AND gate 208 will have no output. In summary, AND gate 208 operates during the acceleration period to detect the first occurrence when a feedback single-shot pulse arrives prior to a clock single-shot pulse, and thereby detects that the lens is up to speed.

The output of AND gate 208 indicating that the lens is up to speed is used to set latch 210. The set condition in latch 210 produces a DC level output identified as the Up-to-Speed signal. The rising edge of the Up-to-Speed signal is used to fire single-shot 212 which produces a pulse on line identified as Up-to-speed Single-Shot.

Latch 210; which indicates up to speed, may be reset by either of two conditions. First, if the lens is not moving, inverter 214 will have an output which is passed by OR gate 216 to reset the latch 210. Second, if the lens is moving but the stop timer has been fired, then the stop timer pulse is passed by OR gate 216 and resets the latch 210.

Additional circuitry in the up-to-speed detector is provided to enlarge the time window during which a feedback single-shot pulse will cause an up-to-speed indication if the system is operating in the 36-point mode of operation. This additional hardware is made up of AND gates 218 and 222 and latch 220. In operation, the 36-point mode signal enables AND gate 222 so that it will pass a signal from latch 220. Latch 220 will have an output when it has been set. Latch 220 operates approximately in the same manner as latch 204. The difference is the time at which latch 220 is reset. Latch 204 is reset by the clock single-shot; latch 220 is reset at Count Three (from counter in FIG. 6) after the Clock Single-Shot signal. This delay is achieved by the latch 204 enabling AND gate 218 when latch 204 is reset by the Clock Single-Shot. AND gate 218 then passes the Count Three signal to reset latch 220. The output of the latch 220 accordingly remains up from feedback clock reset time until three counts after clock single-shot time. This pulse time period is passed by AND gate 222 only during 36-point mode operation to OR gate 206. OR gate 206 conveys the signal to AND gate 208. The effect is that AND gate 208 will continue to look for a feedback single-shot pulse three counts after the clock single-shot signal when operating in 36-point mode.

The purpose is to reduce lens velocity overshoot of the speed beyond the desired speed by detecting, in 36-point mode operation, when the lens speed is nearly up-to-speed. The reason for this function in 36-point mode is that at 36-point mode speed, the feedback single-shot pulses are far enough apart in time so that if the up-to-speed detector just missed detecting the proper speed at the previous feedback pulse (i.e., the lens speed was a little lower than up-to-speed), by the time the next feedback single-shot pulse occurred, the lens speed would overshoot well beyond the desired speed. Accordingly, enlargement of the time window during which AND gate 208 will generate an up-to-speed signal means that the up-to-speed signal may be indicated even though the lens speed is slightly below what is desired. However, this condition is easier to correct than large overshoot in lens speed and can be more easily handled by the accelerate/decelerate controls.

Referring again to FIG. 6, the operation of the clock pulse generator is as follows. During acceleration of the lens from a stop condition, the up-to-speed signal is not present. Accordingly, inverter 172 enables AND gate 170 to pass the trailing edge of the first feedback single-shot pulse to fire single-shot 174. The Feedback Clock Reset pulse from single-shot 174 resets the counter 180 so that the counter begins to count from zero. When the counter reaches the count specified for 18-point mode operation, a clock pulse is passed to the AND gate 190. If 18-point mode operation is present, AND gate 190 passes the clock pulse to set latch 194. The rising edge of the output level from latch 194 fires single-shot 200 to produce the Clock Single-Shot signal.

Operation of the up-to-speed detector in FIG. 7 during acceleration is as follows. The Clock Single-Shot pulse resets the latch 204 after the latch was set by the Feedback Clock Reset pulse. The comparison operation performed by the AND gate 208 between the time of the feedback single-shot pulse and the clock single-shot pulse is not operative because the Start Timer pulse, which is controlling the acceleration, is present until near the end of the acceleration. Accordingly, the output from inverter 224 inhibits AND gate 208 until after the Start Timer pulse has elapsed.

During initial acceleration, the Clock Single-Shot pulse in FIG. 6 is passed by OR gate 178 to reset the counter 180 back to zero. This procedure continues until after the start timer pulse has elapsed. At that point, the same procedure in the clock pulse generator continues until the AND gate 208 in the up-to-speed detector detects that the feedback single-shot pulse has occurred prior to the clock single-shot pulse. At that point in time, an Up-to-Speed signal will appear out of the latch 210 in the up-to-speed detector. This Up-to-Speed signal is utilized by the clock pulse generator to inhibit AND gate 170 and to enable AND gate 202. With AND gate 170 inhibited, the Feedback Clock Reset pulse will no longer be generated. With AND gate 202 enabled, the Clock Single-Shot pulse is passed by AND gate 202 to reset counter 180. However, the first reset of counter 180 upon generation of up-to-speed indication is by the Up-to-Speed Single-Shot pulse from single-shot 212 in FIG. 7 to OR gate 178 in FIG. 6. Therefore, at up-to-speed indication, the counter 180 is reset by the up-to-speed single-shot and, thereafter, the clock pulse generator is operating internally, resetting itself upon each Clock Single-Shot pulse output.

Once the lens has reached the up-to-speed condition, control of the speed of the lens to keep it at a proper speed is by means of the accelerate/decelerate controls 120 in FIG. 3. The details of the accelerate/decelerate controls is shown schematically in FIG. 8. The accelerate/decelerate controls also receive the Start Timer signal to control the initial acceleration of the lens as it is accelerating to the desired speed.

Figure 8:
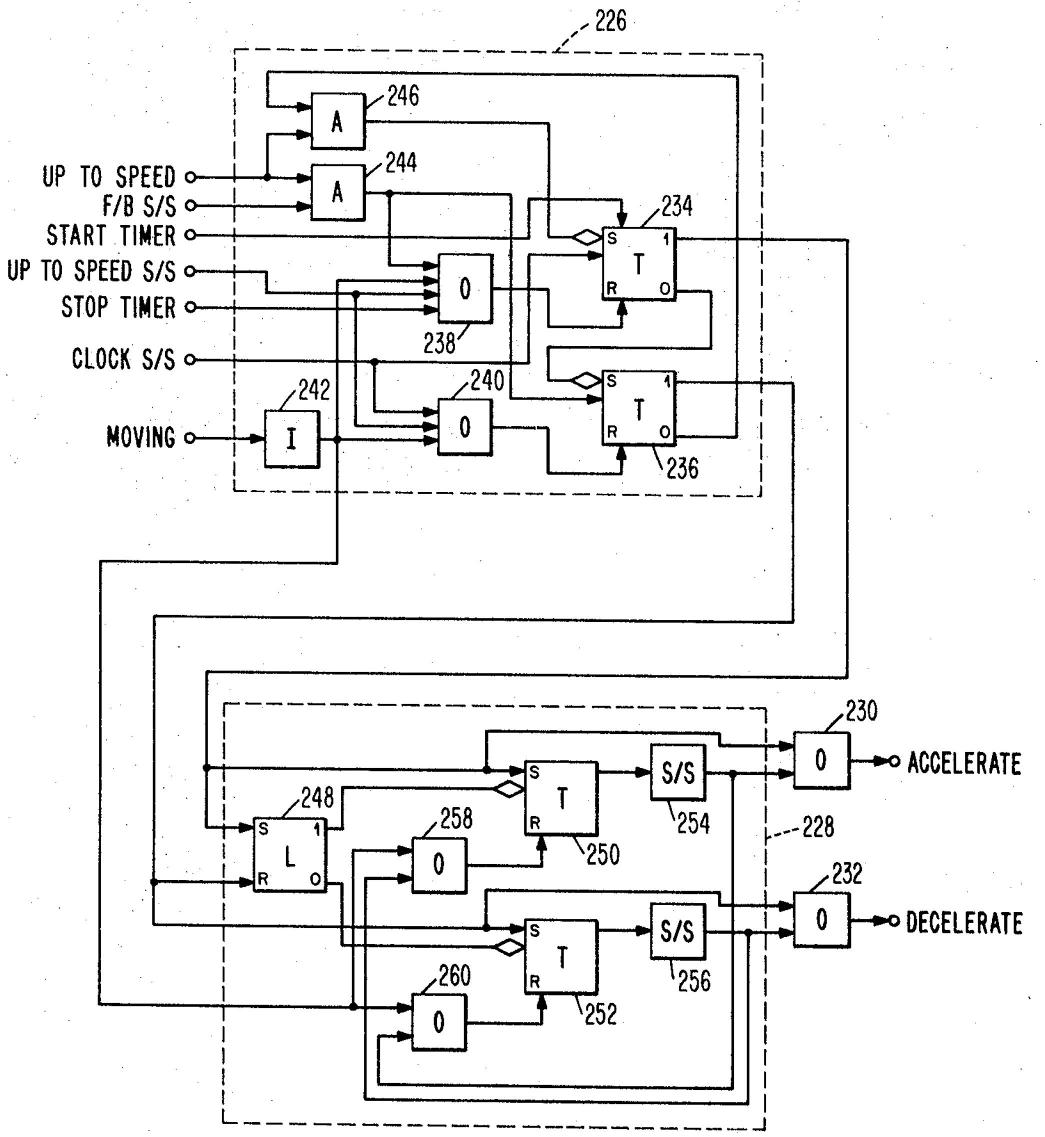
FIG. 8 is a schematic diagram of the Accelerate-Decelerate Controls of FIG. 3.

The accelerate/decelerate controls may be divided into two circuits—the accelerate/decelerate logic 226 indicated in the upper part of FIG. 8 and the hunt cycle logic 228 indicated in the lower part of FIG. 8. The output from both of these circuits is an accelerate or decelerate signal. These signals are collected by OR gates 230 and 232 to produce the accelerate and decelerate signals.

The basic accelerate/decelerate operation is controlled by the logic 226. Triggers 234 and 236 are the heart of the accelerate/decelerate logic 226. The output from the set side of each of these triggers is passed directly to the appropriate OR gate 230 or 232 to indicate an accelerate or decelerate command to the motor drive controls 122 (FIG. 3).

The accelerate trigger 234 is reset by a signal from OR gate 238. Similarly, decelerate trigger 236 is reset by a signal from OR gate 240. The accelerate/decelerate triggers are reset automatically upon receipt of either of two signals at the OR gates 238 and 240. These signals are: first, the Up-to-Speed Single-Shot pulse, or second, the Not-Moving indication from inverter 242.

The purpose of the reset by the Up-to-Speed Single-Shot is to initialize both the accelerate and decelerate triggers at a reset condition just prior to their operation as controls for keeping the lens at the proper speed. The purpose of resetting the triggers with the Not-Moving signal is to ensure that the triggers are reset each time the lens is stopped. Thus, the triggers will be ready for the next accelerate Up-to-Speed operation.

An additional signal, Stop Timer, is passed by OR gate 238 to reset the accelerate trigger 234. The purpose of this reset is to ensure that the accelerate trigger will be held off while the lens is being decelerated to a stop position. If the stop timer were not used to reset the accelerate trigger 234, it is possible that both an accelerate and decelerate signal might be applied to the motor drive controls simultaneously. This would cause the printed circuit motor drive to become inoperative. Simultaneous accelerate and decelerate signals could exist where the stop timer causes the motor drive controls to produce a signal slowing the lens down while a clock single-shot signal can cause the accelerate/decelerate controls to produce a signal tending to accelerate the lens. Therefore, it is mandatory that the stop timer hold the accelerate trigger 234 reset during the duration of the stop timer signal.

AND gates 244 and 246 which also form a part of the accelerate/decelerate logic 226 are enabled by the Up-to-Speed signal from the up-to-speed detector. Their purpose is to interconnect the accelerate/decelerate triggers to perform a serving type operation to keep the lens at speed once it has reached the proper speed.

Initially, when the lens is at a stop position, both the accelerate and decelerate triggers are reset by the Not-Moving signal. Subsequently, a Start Timer signal arrives and sets the accelerate trigger 234. This is a DC set signal. The accelerate trigger 234 continues to be set until the Up-to-Speed Single-Shot pulse is passed by OR gate 238 to reset the accelerate trigger 234. In the meantime, the decelerate trigger 236 has remained reset during the acceleration period.

With the lens arriving at an up-to-speed condition, AND gates 244 and 246 are enabled. Both the accelerate and decelerate triggers are now susceptible to being AC-triggered into a set condition. This is accomplished because both are in a reset condition, and these reset pulse—fed back to the DC bias set terminal on the opposite trigger. For example, the decelerate trigger 236 has its zero state fed back to the DC bias set terminal of the accelerate trigger 234 via the AND gate 246. Similarly, the zero state of the accelerate 234 is fed to the DC bias set side of the decelerate trigger 236. Consequently, both triggers are looking for an AC set pulse. In the case of the accelerate trigger 234, the AC set pulse is the Clock Single-Shot pulse. For the decelerate trigger 236, the AC set pulse is the Feedback-Single-Shot pulse fed through AND gate 244. Whichever single-shot pulse arrives first will control which of the triggers is set. When one trigger becomes set, the other trigger is inhibited from AC set because it loses its DC bias signal on the set terminal.

Assuming a Feedback Single-Shot pulse is the first signal received, then the decelerate trigger 236 is set. This generates a decelerate signal at OR gate 232 which is passed to the motor drive controls. Such a signal indicates that the lens has exceeded the desired speed and must now be slightly decelerated. The decelerate signal stays on until the decelerate trigger 236 is reset. The trigger 236 is reset by the Clock SingleeShot pulse which is passed by OR gate 240. Accordingly, the duration of the decelerate signal is the difference in time between the Feedback Single-Shot pulse and the Clock Single-Shot pulse.

With the decelerate trigger 236 reset, both triggers are again looking for an AC pulse by which they may be set. In each case, the trigger that first receives a pulse will be set and will then be reset by the subsequent timing pulse — either feedback or clock, as the case may be. Eventually, the lens will be slowed to a speed slightly below the desired speed and the Clock Single-Shot pulse will therefore precede the Feedback Single-Shot pulse. In this event, the accelerate trigger 234 is set by the Clock Single-Shot pulse. The set side of the accelerate trigger produces an accelerate pulse out of OR gate 230 whose duration is dependent upon the time separation between the Clock Single-Shot pulse and the Feedback Single-Shot pulse. When the Feedback Single-Shot pulse arrives, it is passed by AND gate 244 and OR gate 238 to reset the accelerate trigger 234. This turns off the accelerate signal.

In other words, the accelerate/decelerate triggers initially start in the reset condition. The first trigger that receives a single-shot pulse is set and signals the motor drive controls to accelerate or decelerate. The duration of the acceleration or deceleration is controlled by the time difference between the Feedback Single-Shot and the Clock Single-Shot pulses. Eventually, after a period of acceleration or deceleration, the time arrangement of the Feedback Single-Shot and Clock Single-Shot pulses will reverse. This causes a reversal in which trigger 234 or 236 is set and thereby reverses the type of drive signal being applied from accelerate to decelerate or vice versa as is required.

In the lower part of FIG. 8, the hunt cycle controls 228 are used to inject an extra strong accelerate or decelerate signal when two accelerate or two decelerate signals occur in series following a significant change between accelerate and decelerate controls. A significant change is characterized by two sequential pulses of one mode following at least two sequential pulses of the opposite mode. Such a series of accelerate or decelerate signals indicates that the lens speed is considerably different than the desired speed. Therefore, to get the lens back onto the proper speed rapidly, a longer accelerate or decelerate signal is injected to move the lens rapidly back to the desired speed.

Latch 248 operates with triggers 250 and 252 to detect when two successive accelerate pulses or two successive decelerate pulses have occurred. For example, in the case of two accelerate pulses, the first accelerate pulse sets latch 248. The output of latch 248 then enables or provides the DC bias for the set terminal of trigger 250. Consequently, if the next pulse is an accelerate pulse, the trigger 250 will be set. If the next pulse had been a decelerate pulse, the hunt latch 248 would have been reset and the DC bias on trigger 250 would have disappeared. Assuming the second pulse was an accelerate pulse, then with trigger 250 set, too-slow single-shot 254 is fired and produces an accelerate timing pulse which is passed by OR gate 230 to the motor drive controls. The period of the Too-Slow Single-Shot pulse is much longer than the normal accelerate pulse and will provide a strong accelerate signal to the lens speed. A similar operation occurs between latch 248 and the too-fast trigger 252 in the event two decelerate pulses are received successively.

The too-slow and too-fast triggers 250 and 252 are reset initially when a not-moving signal is received from inverter 242. During operation, the triggers 250 and 252 are reset by single-shots 254 and 256. The accelerate single-shot 254 is utilized to reset the too-fast trigger, while the decelerate single-shot 256 is utilized to reset the too-slow trigger 250. OR gates 258 and 260 merely act as a collecting point for the reset signals to be applied to triggers 250 and 252, respectively.

Use of the output of each of the triggers 250 and 252 to reset the companion trigger ensures that the same too-fast or too-slow trigger will not be operative two times in a row. The single-shot attached to each trigger produces a pulse which is long enough in duration to assure driving the lens speed hard back in the proper direction. However, if two of these stronger pulses were generated in succession, the lens speed might be moved so far off that it would be very difficult to get the lens speed back to the proper speed.

Figure 9:
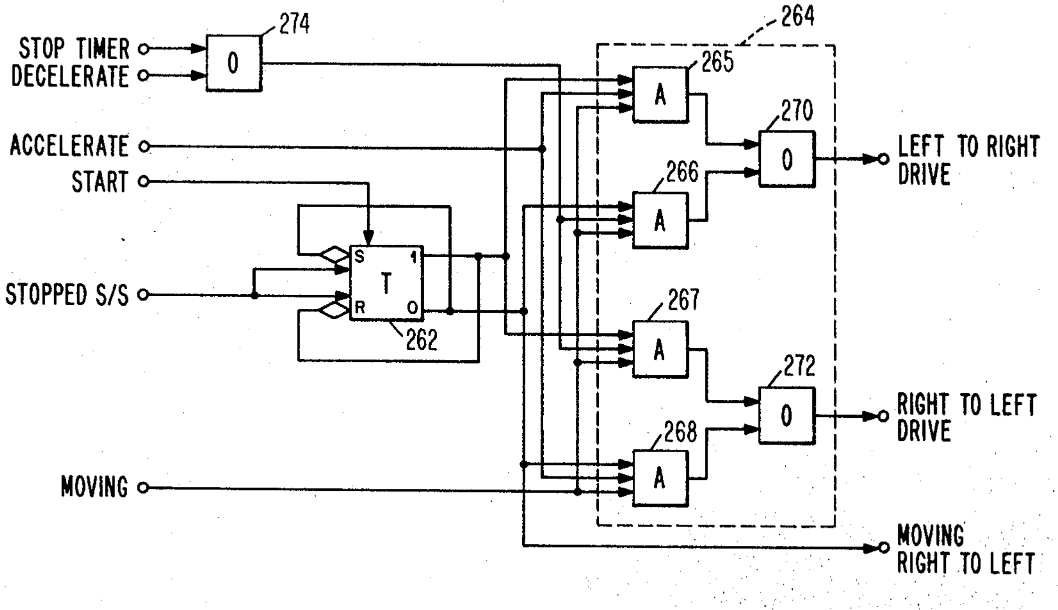
FIG. 9 is a schematic diagram of the Motor Drive Controls of FIG. 3.

The accelerate/decelerate signals out of the controls in FIG. 8 are applied to the motor drive controls shown in detail in FIG. 9. Trigger 262 in FIG. 9 keeps track of the present direction of movement of the lens. This direction information, along with accelerate/decelerate information, is decoded by the logic 264 in the right-hand side of FIG. 9 to determine whether a left-to-right or right-to-left drive signal is to be applied to the printed circuit motor drive.

The input signals applied to the logic 264 are moving, accelerate, stop timer or decelerate, moving right-to-left, and moving left-to-right. The moving signal enables all of the AND gates 265-268. Each of these AND gates then monitors a given pair of conditions to detect the presence of a pair of signals. A pair is made up of one signal indicating the direction of movement of the lens and the other signal indicating whether the lens is to be accelerated or decelerated.

AND gate 265 monitors the left-to-right direction and the accelerate signal. If both of these signals are present when the lens is moving, AND gate 265 has an output which is collected by OR gate 270 and passed out as a left-to-right drive signal. The other left-to-right drive signal results when AND gate 266 detects that the lens is moving from right-to-left and that a decelerate signal is present. In both of these instances, it is necessary to provide a left-to-right drive signal to the printed circuit motor driver. In the first instance, the left-to-right drive signal causes the motor to accelerate, whereas in the second instance, the left-to-right drive signal causes the motor to decelerate. The identical function for right-to-left drive is performed by AND gates 267 and 268 whose outputs are collected by OR gate 272.

In addition to the decelerate command, which is applied to the logic 264, the stop timer signal is also applied to the logic 264. Stop timer acts through the OR gate 274 whose output is connected to the logic 264. As discussed previously, the stop timer signal controls the length of deceleration when the lens is being stopped.

With regard to trigger 262, the trigger is initialized by the start command at the beginning of operation of the printing system. This start command is a DC signal of short duration which sets the trigger and thereby the trigger indicates a left-to-right movement of the lens. The set output from the trigger is fed back to provide a DC bias to the reset side of trigger 262. Accordingly, at the end of the first line, when the stopped single-shot fires, trigger 262 will be reset. The zero side or reset side of the trigger then comes up indicating that the lens will be moving in a right-to-left direction during the next print line. With the trigger reset, the zero side of the trigger biases the set input of the trigger so that the next stopped single-shot pulse will cause the trigger to be set. Thus, the trigger is initially set to indicate a left-to-right movement of the lens and thereafter alternates its binary state each time the lens stops (i.e., the end of each line). As pointed out previously, this direction information is combined with the accelerate/decelerate commands to control the left-to-right and right-to-left drive signals out of the motor drive controls.

While the invention has been particularly shown and described with reference to preferred embodiments thereof, it will be understood by those skilled in the art that various changes in form and details may be made therein without departing from the spirit and scope of the invention.

What I claim is:

1. A photocomposing apparatus for forming a pattern of images on a radiation sensitive record receiver from radiation produced by the screen of a cathode-ray tube and directed to scan said record receiver in successive scans, comprising a cathode-ray tube controlled to sweep the beam successively along a single trace on said screen to form successive scans, means to blank and unblank said beam to produce radiation from the unblank segments of successive scans,
radiation directing means in the path of said radiation to direct said radiation to said record receiver, said radiation directing means and said record receiver being relatively movable so that successive scans of said radiation move across said record receiver transversely of the said scans,
driving means to produce relative movement of said radiation directing means and said record receiver, and
adjustable control means including means operable conjointly to adjust the length of the sweep of said beam to conform to dimensions of images of different sizes, and to decrease or increase the speed of said driving means with increase or decrease in the length of said sweep, respectively.

2. A photocomposing apparatus under control of electrical signals for forming a pattern of images on a radiation sensitive record receiver from radiation produced by the screen of a cathode-ray tube and directed to scan said record receiver in successive scans, comprising
a cathode-ray tube controlled to sweep the beam successively along a single trace on said screen to form successive scans,
means to blank and unblank said beam to produce radiation from the unblank segments of successive scans in response to said electrical signals,
radiation directing means movable in the path of said radiation to direct successive scans of said radiation across said record receiver transversely of the said scans,
driving means to move said radiation directing means, and
adjustable control means to adjust the length of the sweep of said beam in response to certain of said electrical signals to conform to dimensions of images of different sizes,
said certain of said signals also actuating control means for decreasing or increasing the speed of said driving means with increase of decrease in the length of said sweep, respectively.

3. A photocomposing apparatus as claimed in claim 2, including means responsive to said certain of said signals to adjust the bias on said tube so that the center of the trace of the sweep of said beam is positioned on the centerline of said screen for any length of sweep.

4. A photocomposing apparatus as claimed in claim 2, in which said radiation and said record receiver are relatively movable in a direction normal to movement of successive scans across said record receiver.

5. A photocomposing apparatus as claimed in claim 2, including means to decelerate said driving means under control of said certain of said signals at the end of the relative movement of said radiation across said record receiver to arrest said relative movement in the same relative position irrespective of the speed of said driving means.

6. The method of producing a pattern of an image on a record receiver which is sensitized by radiation received from the screen of a cathode tube, comprising
moving a refractive member in front of the face of the cathode-ray tube to direct radiation from successive image elements formed on the screen of said tube across the record receiver to sensitize said receiver in a pattern of successive image elements,
controlling the maximum sweep of said beam of said cathode-ray tube to conform to the dimensions of image elements of varying size, and controlling the speed of a motor which moves said refractive member to vary the speed of said motor inversely to the length of the maximum sweep of said beam.

7. The method of producing a pattern of an image on a record receiver which is sensitized by radiation received from the screen of a cathode-ray tube under control of electrical signals, comprising
scanning the screen of a cathode-ray tube in successive sweeps of the beam along a single trace,
blanking and unblanking the beam on successive scans in response to signals representing a pattern of an image,
directing the radiation from each unblank segment of each scan to a record receiver and sensitizing said receiver by radiation from the unblank segments of said scans,
directing said radiation across said record receiver in successive scans to traverse said record receiver in a direction transverse to the direction of said scans,
controlling the maximum length of said scans by certain of said signals and
controlling the speed of movement of said radiation across said receiver by said latter signals.

8. The method claimed in claim 7, which comprises directing said radiation by moving a refractive member in front of said screen relative to said record receiver and driving said element with a motor under control of said signals controlling the speed of said motor.

9. The method claimed in claim 7, which comprises decelerating said motor at the end of each traverse of said record receiver according to the speed of said motor to stop the motor in the same position at the end of each traverse irrespective of its speed of driving said element.

10. The method claimed in claim 7, which comprises providing a bias on said tube under control of said certain of said signals to center the trace of the sweep of said beam on the centerline of said screen.

UNITED STATES PATENT OFFICE
CERTIFICATE OF CORRECTION

Patent No. 3,585,296 Dated June 15, 1971

Inventor(s) VAN CLIFTON MARTIN

It is certified that error appears in the above-identified patent and that said Letters Patent are hereby corrected as shown below:

Column 7, line 2, "serving" should be "servoing"

Column 12, lines 41-42, "serving" should be "servoing"

Column 12, line 56, "pulse-fed" should be "conditions are fed"

Signed and sealed this 11th day of January 1972.

(SEAL)
Attest:

EDWARD M.FLETCHER,JR.
Attesting Officer

ROBERT GOTTSCHALK
Acting Commissioner of Patents